United States Patent [19]

de Fontenay

[11] Patent Number: 5,028,038
[45] Date of Patent: Jul. 2, 1991

[54] ELASTIC VIBRATION ISOLATION MOUNTING WITH INTEGRAL HYDRAULIC DAMPING AND A RIGID PARTITION WITH AN ADJUSTABLE PASSAGE FOR CONDUCTING FLUID

[75] Inventor: Etienne de Fontenay, Decize, France

[73] Assignee: Caoutchouc Manufacture et Plastiques, Versailles, France

[21] Appl. No.: 475,338

[22] Filed: Feb. 5, 1990

Related U.S. Application Data

[62] Division of Ser. No. 177,583, Apr. 4, 1988, Pat. No. 4,909,490.

[30] Foreign Application Priority Data

Apr. 3, 1987 [FR] France ................. 87 04787

[51] Int. Cl.[5] .............................. F16F 13/00
[52] U.S. Cl. .................... 267/140.1; 138/30; 138/43; 180/312; 248/562; 248/636
[58] Field of Search ........... 267/140.5 R, 140.1 A, 267/220; 248/562, 636; 180/300, 312, 902; 138/30, 43; 123/192 R

[56] References Cited

U.S. PATENT DOCUMENTS

| | | |
|---|---|---|
| 4,422,779 | 12/1983 | Hamaekers et al. .... 267/140.1 A X |
| 4,618,128 | 10/1986 | Härtel et al. ............. 267/140.1 |
| 4,681,306 | 7/1987 | Hofmann et al. ............ 267/140.1 A |
| 4,699,099 | 10/1987 | Arai et al. ................... 123/192 |
| 4,709,898 | 12/1987 | Yoshida et al. ......... 267/140.1 A X |
| 4,754,956 | 7/1988 | Barone et al. ............ 267/140.1 A X |

FOREIGN PATENT DOCUMENTS

| | | |
|---|---|---|
| 0155646 | 9/1985 | European Pat. Off. . |
| 0192782 | 9/1986 | European Pat. Off. . |
| 0209682 | 1/1987 | European Pat. Off. . |
| 3611529 | 10/1987 | Fed. Rep. of Germany . |
| 2430546 | 7/1978 | France . |
| 2467724 | 4/1981 | France . |
| 2443615 | 1/1983 | France . |
| 2462618 | 4/1984 | France . |
| 2575253 | 6/1986 | France . |
| 2511105 | 9/1986 | France . |
| 9117930 | 7/1984 | Japan . |
| 61-52439 | 3/1986 | Japan . |
| 61-55426 | 3/1986 | Japan . |
| 1144443 | 7/1986 | Japan . |
| 1205503 | 9/1986 | Japan . |
| 2191561 | 12/1987 | United Kingdom . |

Primary Examiner—George A. Halvosa
Attorney, Agent, or Firm—Thomas N. Ljungman

[57] ABSTRACT

Elastic anti-vibration isolation apparatus with integrated hydraulic damping, consisting of a thick conical membrane of elastomer compound bonded to internal and external rigid frames, and crimped in a casing containing a damping liquid, characterized by the fact that the rigid partition which separates the variable volume chamber from the expansion space has a passage for the damping liquid realized in one or two parts, the dimensions of which can be adjusted by grinding or lathe-working at least one of the components, base or cover, of the rigid partition, or by the insertion of shims between the constituent parts, thereby making it possible, using a set of similar components, to realize a range of elastic mountings with damping characteristics adapted to desired utilization frequencies.

11 Claims, 10 Drawing Sheets

Section BOB'

Section COD

Section BOB'

Section COB'

Section BOD

ELASTIC VIBRATION ISOLATION MOUNTING WITH INTEGRAL HYDRAULIC DAMPING AND A RIGID PARTITION WITH AN ADJUSTABLE PASSAGE FOR CONDUCTING FLUID

This is a division, of application Ser. No. 07/177,583, filed on Apr. 4, 1988, now U.S. Pat. No. 4,909,490.

BACKGROUND OF THE INVENTION

1. Field of the Invention

This invention relates to anti-vibration, isolation devices for machines, in particular elastic mountings for automobile motors or the cabs of large trucks. It relates to high-flexibility mountings with integrated hydraulic damping, increasing the apparent rigidity in a very limited range of rather low frequencies, by means of a column of liquid which is very long in relation to its cross section. The resonance of this column counteracts large amplitude displacements, but does not deleteriously affect, to any substantial degree, the elastic filtering a higher frequencies.

A range of such elastic mountings is generally made possible by means of a thick conical elastomer membrane which, when bonded to a support casing and a central framework to fasten it to the housing to be suspended, e.g., the power unit, encloses a chamber containing a damping liquid forced into an expansion space, under low pressure, through a device with a long inertial column, with the major portion of the vertical load being borne by deformation of the elastomer constituting the conical membrane.

French Patent Nos. 2,443,615, 2,462,618, 2,467,724 and 2,511,105 (Peugeot) describe devices which fit this definition and which have the advantage of being integratable into the elastic apparatus with a damping column, which is fitted in a rigid wall immersed in the hydraulic circuit. Thus constituted, the device after being sealed, e.g., by crimping on an attachment cover for the casing, of the mounting, thereby manifests itself as a one-piece component.

Various improvements have been made to these devices. For example, the device based on a hydrodynamic braking nozzle (French Patent No. 2,430,546 to Chrysler) includes a displacement of liquid aided by a resonant mass, acting as an inertial damper Others relate to the use of the mass of the liquid itself, and an adjustment of the characteristics thereof, thereby making possible a low rigidity in response to vibrations at frequencies higher than 25 Hz. Low rigidity in this frequency range is effective for general soundproofing, and also provides good damping at the suspension frequencies, that is, in the range of 5 to 15 Hz, where disturbances become noticeable to passengers, as soon as the amplitude of the movements communicated to the supported structure exceeds one millimeter.

French Patent No. 2,575,253 for this type of hydraulic shock absorber, called a "column mounting", specifies the simultaneous existence of a secondary passage having different throttling characteristics than the principal throttling passage.

An analysis of the prior art shows that it apparently does not include hydroelastic mountings with a long liquid column which is possibly even longer than the length of an annular passage and which passage can easily be adjusted to accommodate the hydroelastic mounting.

All of the above-mentioned patents are hereby expressly incorporated by reference as if the entire contents thereof were fully set forth herein.

2. Object of the Invention

The object of the invention is to provide a hydroelastic mounting with a structure having a passage for receiving the damping liquid, which passage is housed in the rigid partition between the variable volume chamber and the expansion space of a hydroelastic mounting. The length and/or cross section of this passage can be adjusted to substantially, precisely regulate the strokes and frequencies necessary for use in particular applications, by acting on the mass of liquid contained in this passage and on the surface of the boundary layer sheared during the alternating movements of the liquid.

SUMMARY OF THE INVENTION

Using identical constituents, with the exception of the rigid partition, i.e., for the same dimensions of the variable volume chamber and the expansion space, and for the same rigidity of the thick conical membrane constituting the deformable wall, the invention proposes to create a range of hydroelastic mountings with damping characteristics adapted to each application, under economic conditions which allow fabrication in small quantities, by acting on the parameters of the column of damping liquid, i.e., its cross section and/or its length.

The elastic anti-vibration isolation mounting with integrated hydraulic damping which is the object of the invention is characterized by the fact that:

- it comprises a passage, consisting of one or two parts, and designed to contain the damping liquid;
- this passage, when it consists of a single part, is constituted either by a spiral or by a helix, which allows the length of the passage to be greater than a corresponding circumferential portion being disposed at substantially the same distance from a central portion of the rigid partition as the spiral or helix;
- the passage, when it consists of two parts, may be constituted of either two overlapped spirals having the same center, or two overlapped helixes having the same axis;
- the dimensions (length and/or cross section) of the passage for damping liquid can be adjusted by simple mechanical means such as removal of material from at least one of the two parts of the rigid partition, appropriate processing, which may include molding to size, lapping, grinding, finishing, latheworking, or the like, the insertion of a shim between the base and the cover of the rigid partition, or the rotation of one of these constituents in relation to the other, to adjust the column of damping liquid to the desired frequencies for different applications.

The different processes for the adjustment of the dimension of the passage for damping liquid, taken separately or in combination in certain cases where compatible, are as follows:

To change the length of the passage, it is possible:

- to change the diameter of the boring where it opens onto rigid partition, by appropriate processing, which may include boring, grinding and/or latheworking. This process is applicable to a passage consisting of one or two parts, in the form of a spiral or spirals;
- to offset the boring, in the case of a passage in two parts, in the form of spirals. The length is then adjusted independently over both parts of the passage;

to use the rotation of the cover in relation to the base of the rigid partition, at the time of assembly, in the case of a passage for damping liquid in one or two spiral parts The adjustment of the length is then the same for both spiral parts of the passage.

To change the cross section of the passage for damping liquid, it is possible:

to perform a flat processing, such as, grinding or lathe-working, of at least one of the assembly surfaces of the base and of the cover of the rigid partition, which results in a reduction of the cross section of the passage, in one or two parts, in the form of a spiral or spirals or a helix or helixes, the adjustment of the two spiral or helicoidal parts then being the same;

to perform an oblique grinding or lathe-working of at least one of the assembly surfaces of the base and of the cover of the rigid partition, which is advantageous for the reduction of the cross section of the passage when it consists of two parts, in the form of spirals or helixes, by making it possible to adopt a different adjustment for each of the spirals or helixes;

the insertion of a flat shim between the base and the cover of the rigid partition, which makes it possible to increase the cross section, a process which is applicable when the passage for the damping liquid consists of one or two parts, in spirals or in helixes (the adjustment of the two parts of the passage then being the same);

the insertion of an oblique shim between the base and the cover of the rigid partition, which is advantageous for a passage in two parts, in the form of a spiral or spirals or a helix or helixes, by making it possible to adopt a different adjustment for the increase of the cross section of each of the spirals or helixes. One aspect of the invention resides broadly in an elastic, anti-vibration, isolation apparatus having hydraulic damping, the apparatus for elastically mounting a first component to a second component, the apparatus comprising: an arrangement for mounting the apparatus on a first of the components, the arrangement for mounting being disposed at one portion of the apparatus; another arrangement for mounting the apparatus to a second of the components, the second arrangement for mounting being disposed at another portion of the apparatus; the first arrangement for mounting having bonded thereto an elastomeric component; the elastomeric component forming one end of the apparatus; a rigid partition disposed within the apparatus and separating the apparatus into at least a first chamber and a second chamber, the first chamber being disposed between the rigid partition and the elastomeric component, the first chamber being substantially filled with damping fluid and comprising a chamber in which damping fluid therein is subject to compressing and other forces for varying the volume thereof, the first arrangement for mounting and at least a portion of the elastomeric component being disposed for moving at least with relationship to the rigid partition; the rigid partition having two sides, a first side being disposed towards the first chamber, and a second side being disposed towards the second chamber; the second chamber comprising an expansion chamber for at least accepting damping fluid from the first chamber, the second chamber also being substantially filled with damping fluid; the rigid partition having disposed therein at least one passage having dimensions for conducting damping fluid between the two chambers; the rigid partition comprising at least two components, the at least one passage extending in at least one of the at least two components for passing damping fluid between the first side and the second side of the rigid partition; the at least one passage having a length dimension substantially greater than a cross section dimension thereof; an arrangement for varying at least one dimension of the at least one passage; and the dimension varying arrangement being chosen from at least one member of the group consisting essentially of: a) at least one surface of the rigid partition having been dimensionally adjusted by removing at least a portion of the at least one surface during manufacture to obtain given dimensions; and b) an arrangement for receiving shim between the first and second components of the rigid partition, and also including a shim for insertion into the arrangement for receiving the shim between the first and second components of the rigid partition; the arrangement for varying dimensions of the passage between the two chambers being tuneable to desired damping characteristics for tuning the elastic anti-vibration apparatus to at least one given frequency characteristic.

BRIEF DESCRIPTION OF THE DRAWINGS

The characteristics and variants of the invention are explained in greater detail in the description accompanying the drawings, in which:

FIG. 2a is a section view of the rigid partition, FIG. 2b is a top view of the base and FIG. 2c is a bottom view of the cover;

DESCRIPTION OF THE PREFERRED EMBODIMENTS

Figure 1:
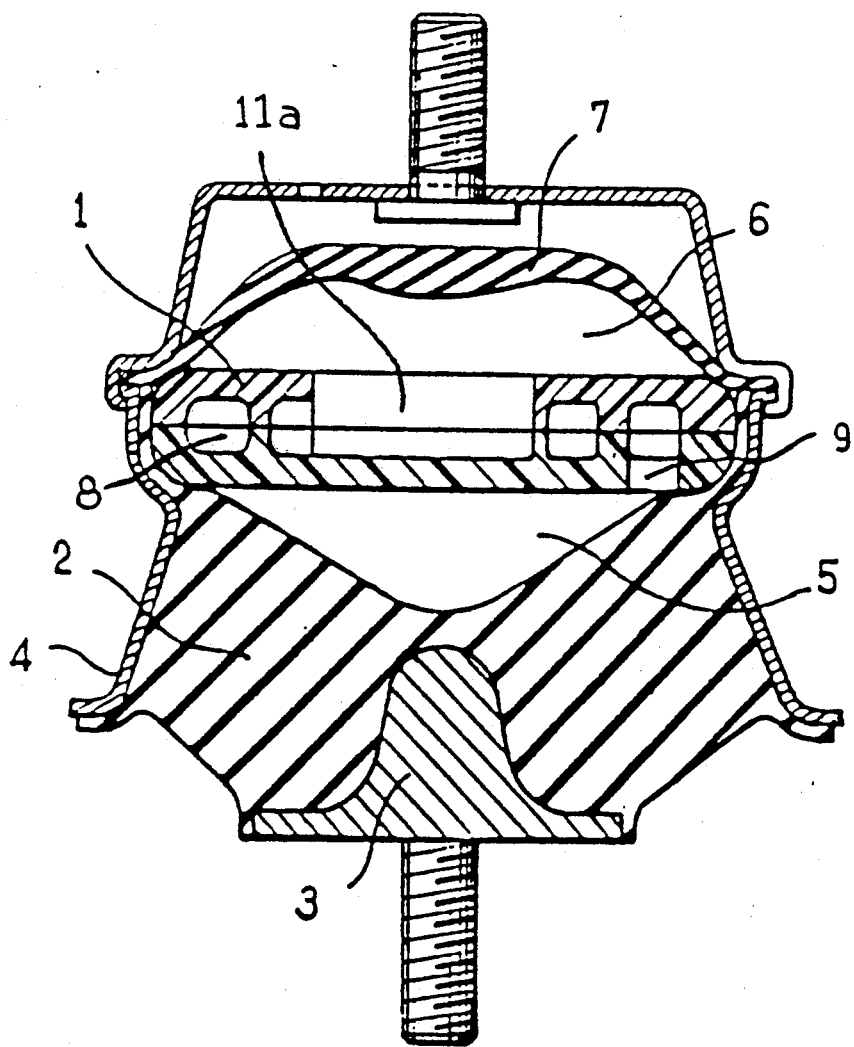
FIG. 1 is a schematic diagram of the elastic mounting with integrated hydraulic damping, and identifies the rigid partition which houses the passage for damping liquid.

FIG. 1 shows, in vertical section, the elastic mounting with integrated hydraulic damping, and identifies the rigid partition 1 in the elastic mounting formed by a deformable thick conical membrane 2, designed to bear the load by strain in shearing of the elastomer compound of which it is made, and which connects the internal rigid frame 3 to the structure of the vehicle, such as, the chassis, and the external rigid frame 4 to the power unit, such as, the motor, of the vehicle.

The damping liquid fills the variable volume chamber 5 and an expansion space 6 where a very low overpressure, that is, pressure above ambient, is maintained by deformation of the flexible membrane 7.

To provide damping during operation of the elastic mounting, the damping liquid is transferred from the variable volume chamber 5 to the expansion space 6, through the opening 9, via the passage 8 housed in the rigid partition 1, and forming part thereof.

In the invention, the prefabricated rigid partition 1 is formed by two assembled rigid elements, preferably made of polymer materials, each molded in its desired shape. The molding of these elements is preferably done using conventional processes of the polymer transformation industry, as is well known in the prior art.

Figure 7:
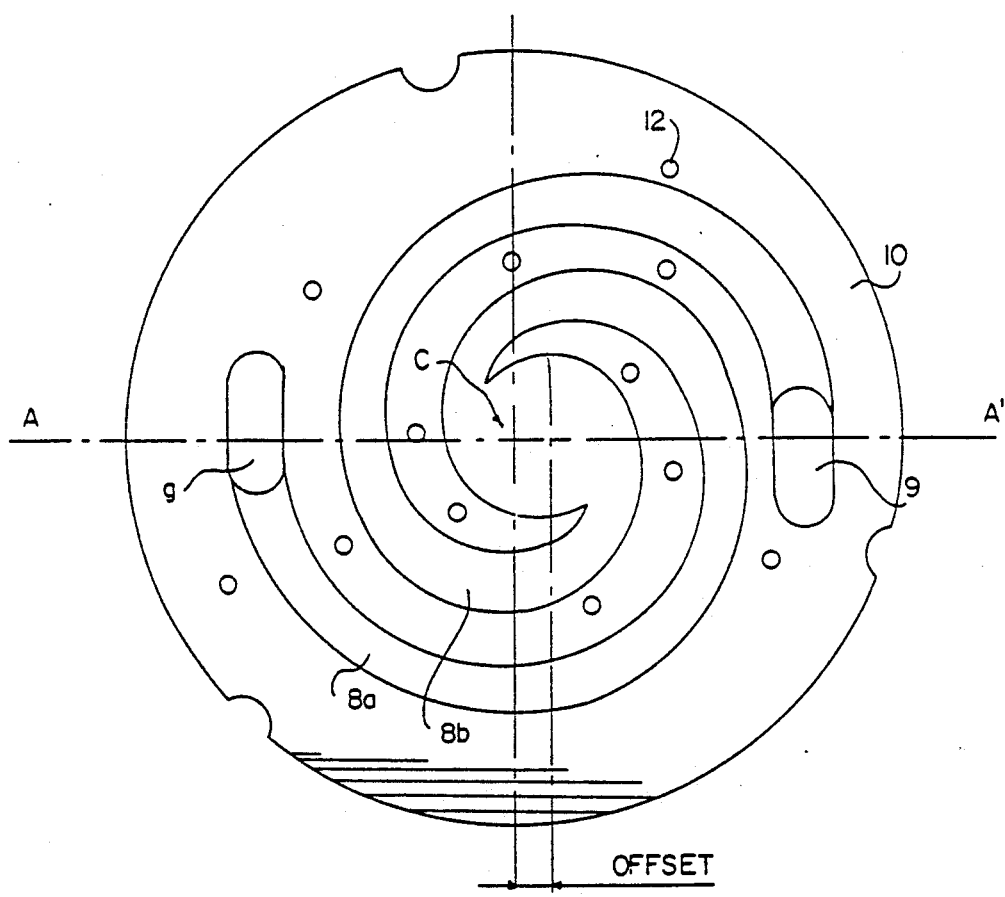
FIG. 7 shows the base in plan with a dual spiral.

One spiral is shown in FIG. 1; in an alternative embodiment analogous to the one of FIG. 7, more than one spiral could be realized.

Figure 2A:
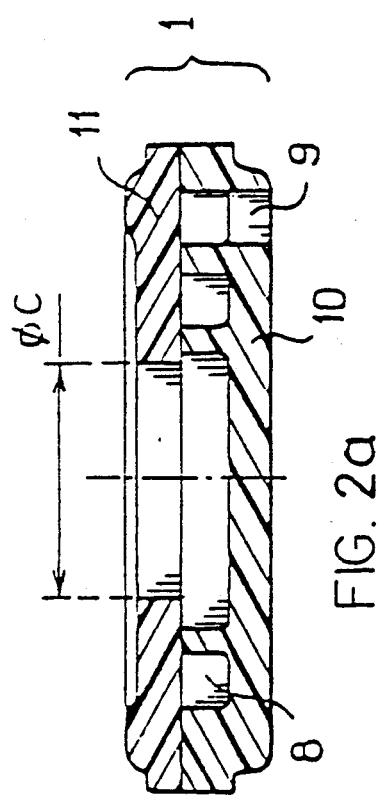
FIGS. 2a, 2b and 2c illustrate one particular configuration of the rigid partition in which the passage for the damping liquid is realized in a single part in the shape of a spiral, more particularly.
Figure 2C:
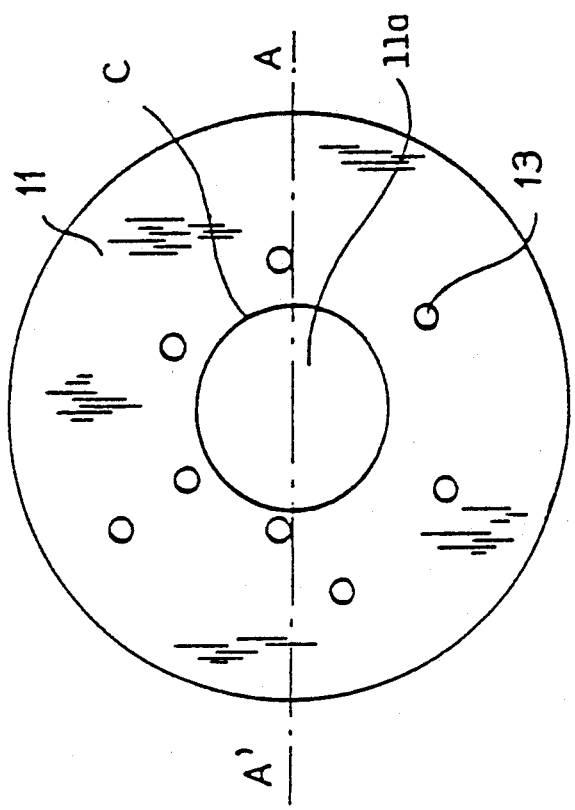
Figure 2B:
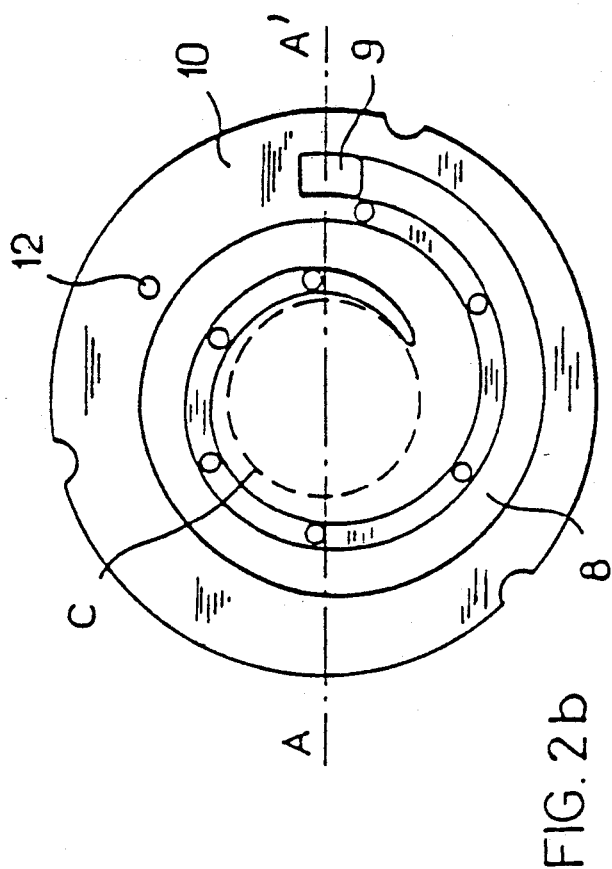

FIGS. 2a, 2b and 2c illustrate one particular configuration of the rigid partition 1 in which the passage for damping liquid 8 manifests itself as a single passage having the shape of a spiral in the partition 1.

FIG. 2a is a cross section of the rigid partition 1, comprising a base 10 and a cover 11. This rigid partition 1 differs from the rigid partition in FIG. 1, where, in FIG. 1, as a function of the desired cross section of the passage for damping liquid, the base 10 and the cover 11 of the rigid partition 1 can have the same geometry of the passage 8. The only substantial differences between the base 10 and the cover 11 are that the base 10 has pins in relief, protruding therefrom and the cover 11 has recessed housings or holes in locations corresponding to the pins for accepting same The positions of the opening 9 and the boring 11a are also different in the base 10 and the cover 11.

In the illustrated variant, in FIG. 2a of the rigid partition 1, the base 10 houses the entire passage for damping liquid 8, while the cover 11 has a flat surface which, during assembly, comes into contact with the base 10.

Communication between the damping liquid circuit and the variable volume chamber takes place via the opening 9 located at the beginning of the passage 8, while communication with the expansion space takes place via a ground, variable diameter C of 1, the boring 11a in the rigid partition 1, both in the base 10 and in the cover 11, i.e., such grinding being possible after assembly of these two components of the rigid partition 1.

The axis of the variable diameter C of the boring 11a in the rigid partition 1 does not necessarily coincide with the axis of the hydroelastic mounting, since its axial offset does not modify the volume of damping liquid displaced by the deformation of the variable volume chamber.

FIG. 2b shows a plan view of the base 10 of the rigid partition 1 before assembly with the cover 11. It shows the spiral shape of the damping liquid passage 8, the length of which is greater than one circumference, and the eight assembly pins 12 shown here, as non-limiting examples, which fit into recessed housings, with the same number and arrangement, in the cover 11. Other methods of assembly well known in the art, such as, bonding or other fastening by a cementing compound may be used.

The grinding or lathe-working of the diameter C of the boring 11a which is tangentially disposed with respect to the spiral, constituting all of one-half of the passage for damping liquid 8, depending on the configuration selected for the cover 11, is advantageously performed on the rigid partition 1 after assembly; the mass production of the rigid partition 1 produced by molding a polymer such as a 6-6 polyamide reinforced with glass fibers or glass spheres, can be highly automated.

FIG. 2c shows, looking at the bottom thereof, the variant of the cover 11 of the rigid partition 1 exhibiting one flat surface which, during assembly, is placed in contact with the base 10. This figure illustrates the arrangement of the recessed housings 13, the number of which is the same as the number of pins 12 on the base 10.

The adjustment of the hydroelastic mounting to the desired damping, by the selection of the shape and size of the passage for damping liquid 8, makes it possible to respond to given utilization conditions such as, for example, the vibration frequency introduced by the masses not suspended by the suspension (or by the motor when the hydroelastic mounting is designed for the suspension of a truck cab).

With all rigidities otherwise equal, the manufacturer of hydroelastic mountings can change the mass of the damping liquid column to shift the frequency at which the apparent maximum damping is produced, by phase displacement between the speed and the acceleration, while measuring forced vibrations.

An increase in the diameter C of the boring 11a being cut into the rigid partition 1, with a constant cross section of the column of damping liquid, reduces the length of the spiral-shape passage 8; the mass and the surface area of the boundary layer of the column of damping liquid are reduced proportionally. The result is an increase of the frequency at which the damping is maximum, accompanied by a reduction of the damping rate and the phase displacement.

The reverse results, obviously, are observed for a reduction of the diameter C of the boring 11a in the rigid partition 1, with a constant cross section of the column of damping liquid.

A reduction of the depth of the passage for damping liquid 8 can be achieved by removing a portion of the assembly plane of the base 10, for example, by spot facing, (according to the embodiment of FIG. 2a), and/or the cover 11, (according to the embodiment of FIG. 1), of the rigid partition 1. This has the effect of reducing the mass of the damping liquid column, similar to that caused by the increase in the diameter C of the boring 11a in the rigid partition 1, but with a reduction of the surface of the boundary layer in contact with the walls of the passage for damping liquid 8. Corresponding to equal displacement of the deformable walls, constituted by the thick conical membrane 2 of the hydroelastic mounting, is a given instantaneous flow and an inversely proportional acceleration of the displacements of the damping liquid in the column with a reduced cross section.

The relative effect of the damping and the phase displacement increases with an increase in frequency, in contrast to the results obtained by modification of the diameter C of the boring 11a in the rigid partition 1.

If the flat grinding or lathe-working of the assembly surface of the base 10 and of the cover 11 of the rigid partition 1 makes it possible to reduce the cross section of the passage for damping liquid 8, there are applications where, when the opposite effect is desired, it is desirable to increase the cross section of the passage. To do this, a flat shim is inserted between the base 10 and the cover 11 of the rigid partition 1, as in FIG. 4. The thickness of the flat shim will, obviously, be limited by the space available between the variable volume chamber and the expansion space.

The combination of the adjustments of the diameter C of the boring 11a and of the depth of the passage for damping liquid 8 therefore makes possible a very precise adjustment of the maximum efficiency of the hydroelastic mounting as a function of the conditions of utilization.

In applications which require an expansion of the frequency ranges, a variant configuration (not shown) of the damping liquid passage allows two different adjustments, thanks to the realization of the passage in two parts, in the shape of spirals, wound one inside the other, as shown in FIG. 7, by offsetting the boring C, which will intersect the first spiral along a developed length less than that along which it intersects the second spiral. For this reason, the two resonant effects, combined with the maximum displacements, will allow an optimal damping over a wider range of frequencies.

It is also possible, for certain particular applications, to realize the configuration of the passage for damping liquid 8 in two spirals, an adjustment with two maximum damping values.

This effect can be obtained either by offsetting the boring, as indicated above, or by modification of the cross sections of the two spiral shaped parts of the passage for damping liquid 8.

Figure 5A:
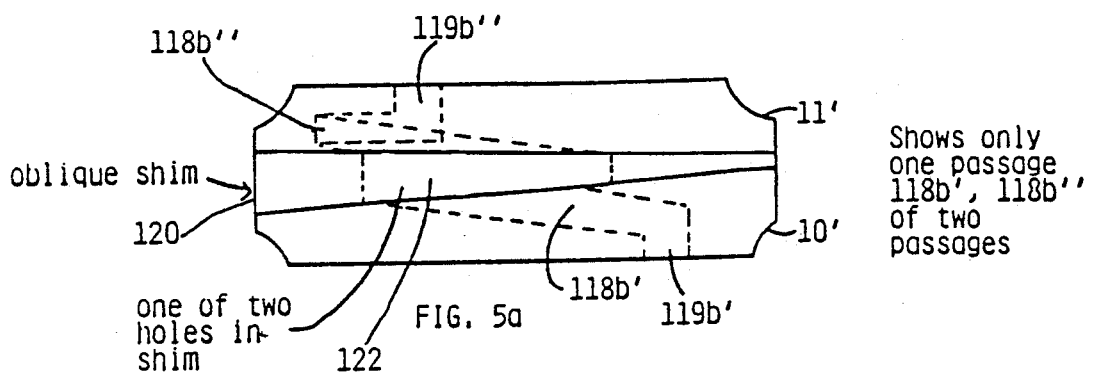
FIG. 5a shows yet another variant of the rigid partition with an oblique shim disposed between the two parts thereof.
Figure 5B:
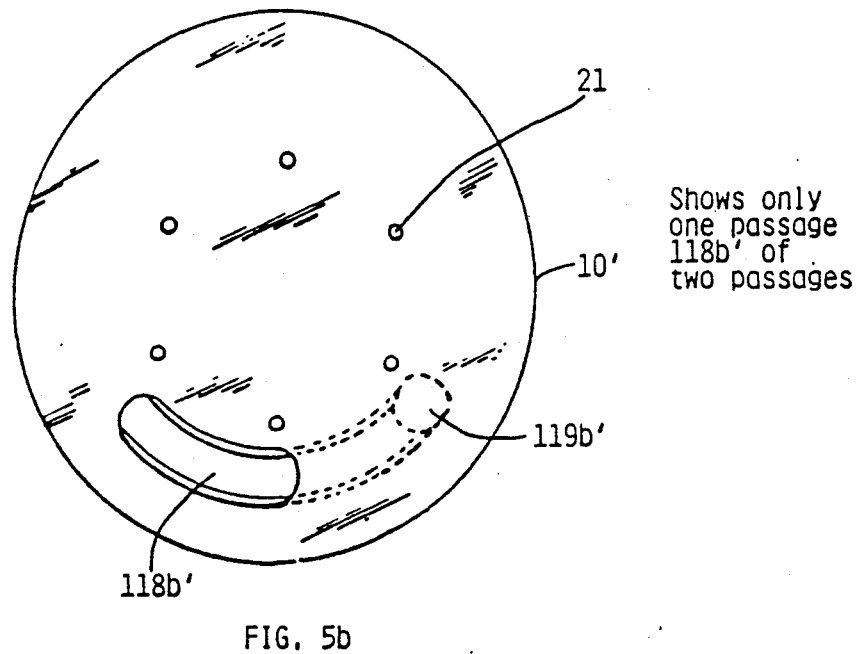
FIG. 5b shows the base of the rigid partition of FIG. 5a, in plan.
Figure 5C:
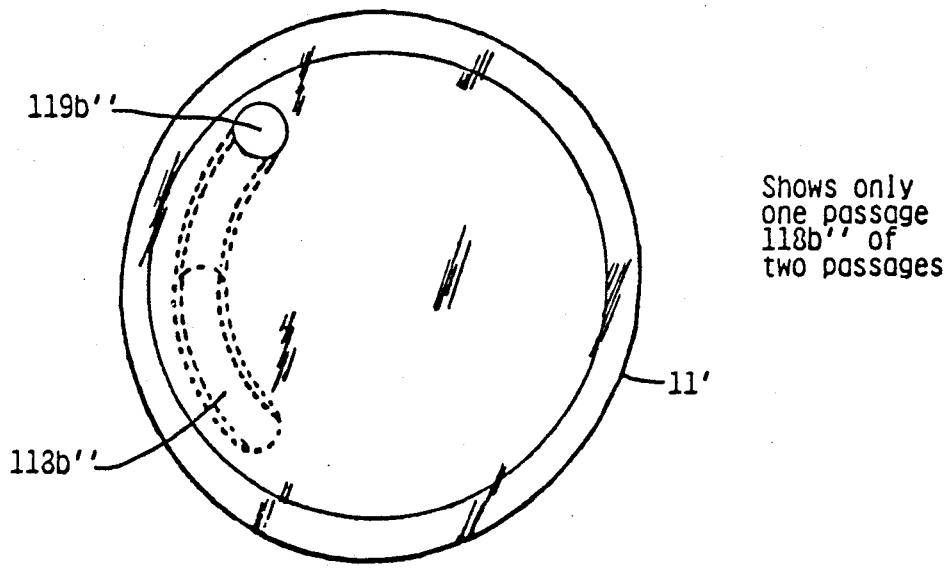
FIG. 5c shows the cover of the rigid partition in plan from the top thereof.
Figure 5D:
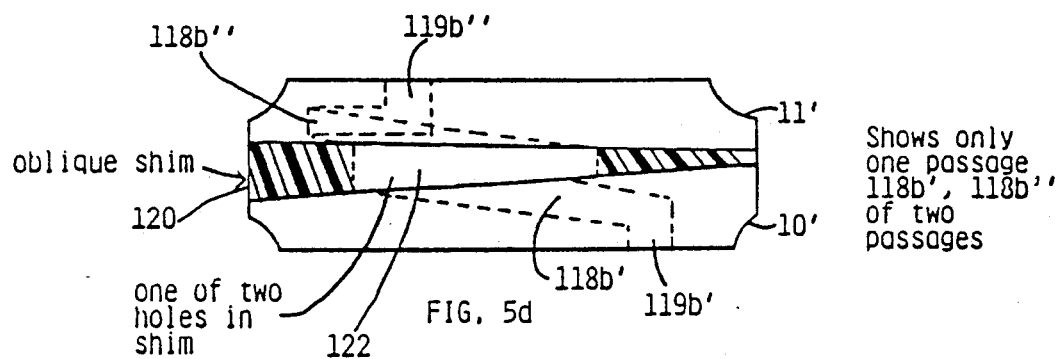
FIG. 5d shows FIG. 5a with the oblique shim, in section.

A reduction of the cross section of at least one of the two parts of the passage 8 is obtained by oblique grinding or lathe-working, as shown in FIG. 5d, of the assembly surface of the base 10 and of the cover 11 of the rigid partition 1, while an increase of the cross section of the passage 8 is made possible by the insertion during assembly of an oblique shim between the base 10 and the cover 11 of the rigid partition 1. These processes make possible the modification of the cross section of one of the spiral shaped parts of the passage for damping liquid 8, independently of the other part. If the same modification of the cross section is desired for both spiral shaped parts of the damping liquid passage 8, there are two possibilities open to the design of the part: a flat grinding or lathe-working of the assembly surface of the base 10 and of the cover 11 makes it possible to reduce, simultaneously, the cross section of the two spiral shaped parts of the passage 8, while the insertion of a flat shim between the base 10 and the cover 11 of the rigid partition 1 during assembly will make it possible to increase simultaneously the cross section of the two spiral shaped parts of the passage 8.

As in the case where the passage consists of a single part in the shape of a spiral, it is possible to change the length or the two spiral shaped parts of the passage 8 by grinding or lath working the boring where they empty onto the rigid partition 1. The manufacturer of hydroelastic mountings, on account of the design of the rigid partition 1, can therefore, change three parameters of the circuit for damping liquid, which will allow him to make the adaptations during assembly of the components of the hydroelastic mounting, for several types of motors or suspensions, with different loads, while being able to benefit from the advantages of mass production of the components, i.e., a reduced production cost and a greater adaptability to evolutions of characteristics, the components being all identical for the different models of a given product, with the exception of the rigid partition 1 which is adjustable, and which can also be mass produced.

FIGS. 3a, 3b, 3c, 3d, 3e, 3f and 3g show one variant of the rigid partition 1 in which the passage for damping liquid 8 no longer consists of two coiled spirals, but two helixes, show cylindrically here, but they can also be conical, overlapped one inside the other, and the coiling over more than one revolution is obtained by a slight slope of each of the helicoidal parts the passage for damping liquid 8 in relation to the axis 10a of the rigid partition 10

Figure 3A:
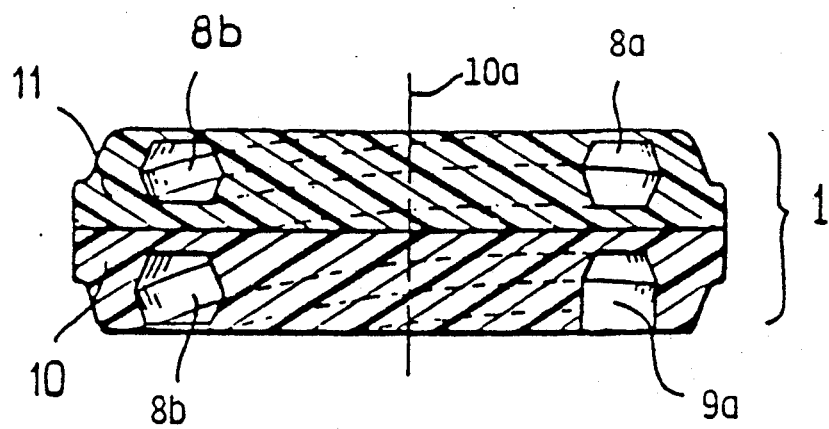
FIGS. 3a, 3b, 3c, 3d, 3e, 3f and 3g show one variant of the rigid partition in which the passage for the damping liquid is realized in two parts having the shape of two overlapped helixes, with the safe axis.
Figure 3B:
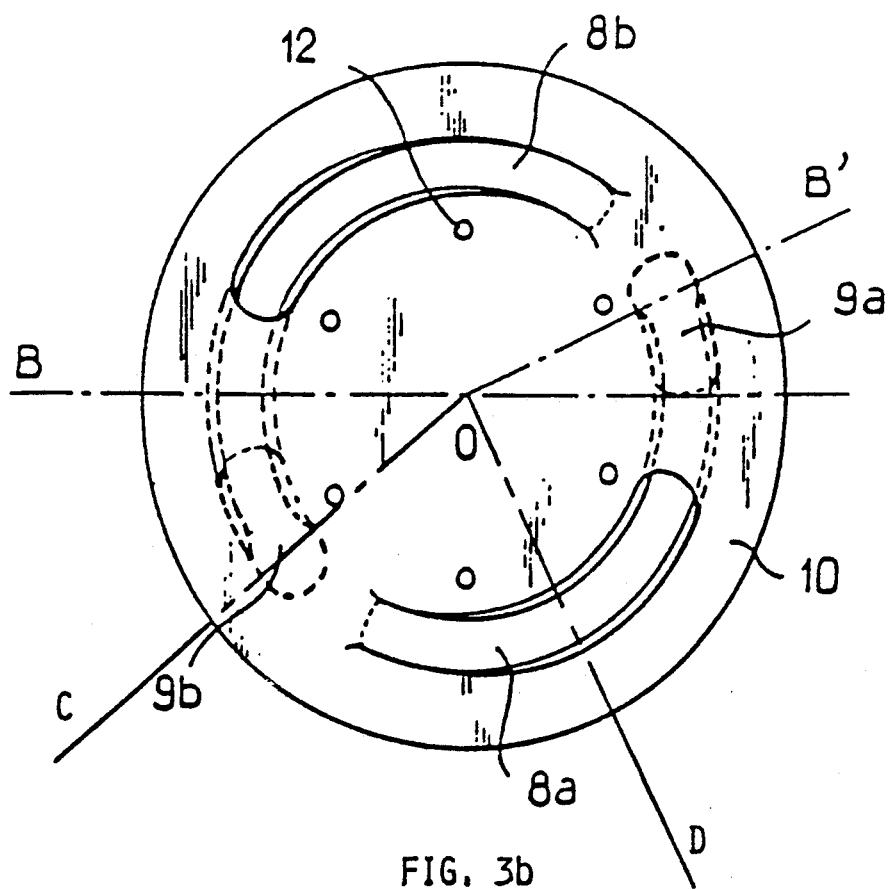

FIG. 3a shows a cross section along BOB' in FIG. 3b of the rigid partition 1 in which the cover 11 is shown with the same general geometry as the base 10, the main difference between these two components being the presence of the assembly pins, e.g., located on the base 10, and designed to fit into the corresponding recessed housings or holes 13 in the cover 11.

FIG. 3b is a schematic diagram of the position of the two helicoidal parts 8a and 8b of the passage for damping liquid in the base 10 of the rigid partition 1 which contains the assembly pins 12.

Various methods make it possible to modify, simultaneously or independently, the length and/or cross section of the double column of damping liquid and, consequently, to change the damping characteristics of the hydroelastic mounting.

Thus, for example, an angular shift during assembly of the base 10 and of the cover 11 of the rigid partition 1, e.g., a rotation of the base 10 by one or more pins 12 in relation to the corresponding recessed housings or holes 13 on the cover 11, simultaneously modifies the cross section of a portion of the two helicoidal parts 8a and 8b of the passage for damping liquid, a well as the useful length of the column of damping liquid between the two openings 9a and 9b, and their corresponding openings in the cover 11, thereby allowing a different adjustment both of frequency and phase displacement, for the apparent damping of the dynamic rigidity exhibited by the hydroelastic mounting.

This means of adjustment by angular shifting of the base 10 and of the cover 11 of the rigid partition 1, with respect to one another, does not change the external dimensions of the rigid partition.

Other adjustment possibilities consist of modifying the thickness of the rigid partition 1 and are limited to values compatible with the installation of the rigid partition in the body of the hydroelastic mounting.

To simultaneously reduce the cross section of the two helicoidal parts 8a and 8b of the passage for damping liquid, it is possible to perform a flat lathe-working of the assembly surface of the base 10 and of the cover 11 of the rigid partition 1, e.g., by lathe-working or grinding the surface of the cover 11 with the preferably, blind holes or recessed housings designed to receive the assembly pins 12.

Figure 4:
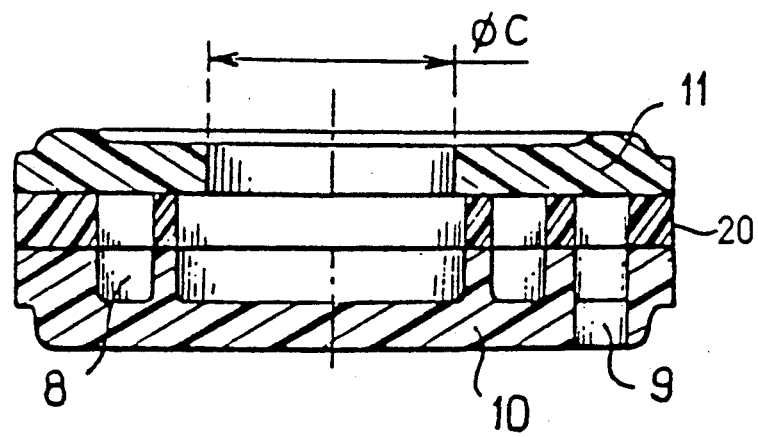
FIG. 4 shows another variant of the rigid partition in which the passage is enlarged by a shim having a spiral cut therein, which shim is inserted between the two parts of the rigid partition.

The insertion between the base 10 and the cover 11 of the rigid partition 1, during assembly, of a flat shim, such as shown in FIG. 4, makes it possible, by contrast, to simultaneously increase a portion of the cross section of the two helicoidal parts 8a and 8b of the passage for damping liquid.

It is also possible to change, separately, the dimensions of the two helicoidal parts 8a and 8b of the passage for the damping liquid, either by performing an oblique grinding or lathe-working of the assembly surface of the base 10 and of the cover 11 of the rigid partition 1, the effect of which may be to reduce a portion of the cross section as well as the useful length of the double column of damping liquid. This arrangement provides a means to obtain different values for each of the two helicoidal parts 8a and 8b of the passage for damping liquid. Alternatively, an oblique shim with a slight slope, can be inserted between the base 10 and the cover 11, during assembly of the rigid partition 1, the effect of which may be to increase the cross section and the useful length of the double column of damping liquid to different values for each of the two helicoidal parts 8a and 8b of the passage for damping liquid.

The rigid partition 1 with a helicoidal passage can be simplified in a variant (not shown) comprising a passage consisting of a single part, for certain applications. The processes to adjust the dimensions of the helicoidal passage are then limited to the angular shifting of the base 10 in relation to the cover 11 of the rigid partition, during assembly, to the flat grinding or lathe-working of the assembly surface of the base 10 and of the cover 11 or to the insertion, between the base 10 and the cover 11, of a flat shim of a thickness limited to values compatible with the installation of the rigid partition 1 in the hydroelastic mounting.

One embodiment of the hydroelastic mounting, as shown in FIG. 2a, in the configuration where the rigid partition 1 includes a one-part passage for the damping liquid 8 is described below, the adjustment method selected being the grinding or lathe-working of the boring 11a.

Figure 3C:
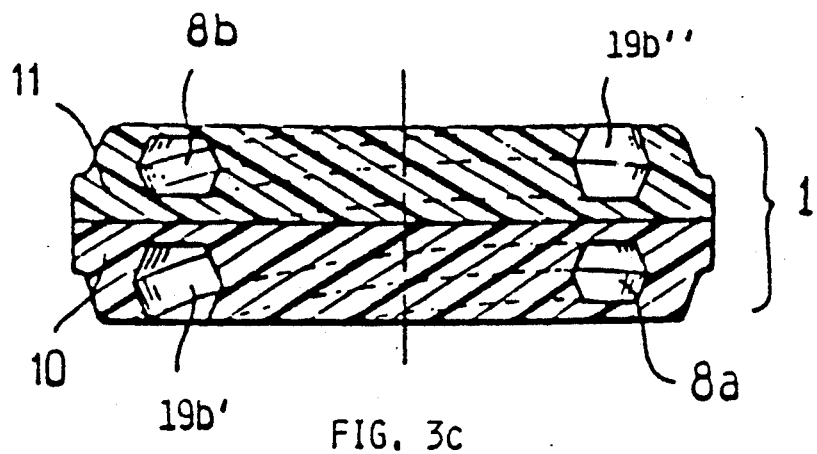

FIG. 3c shows another embodiment of the section through COD of FIG. 3b. In this figure, one hole in base 10 is denoted as 19b', and this hole 19b' is connected through a passage 18b' in base 10, and through a corresponding passage in cover 11 to a hole 19b" in the cover 11.

Figure 3D:
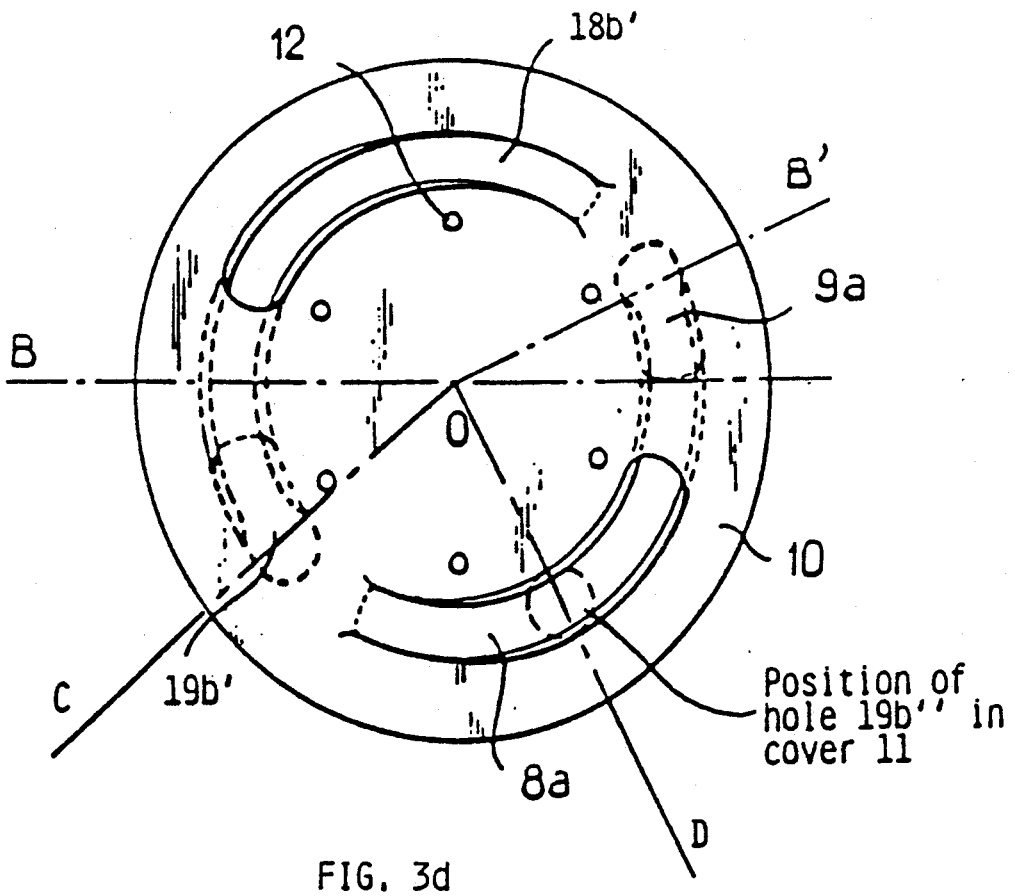

FIG. 3d shows a variant of FIG. 3b with reference numeral denotations of FIG. 3c, and section lines BOB', COD, COB' and BOD.

Figure 3E:
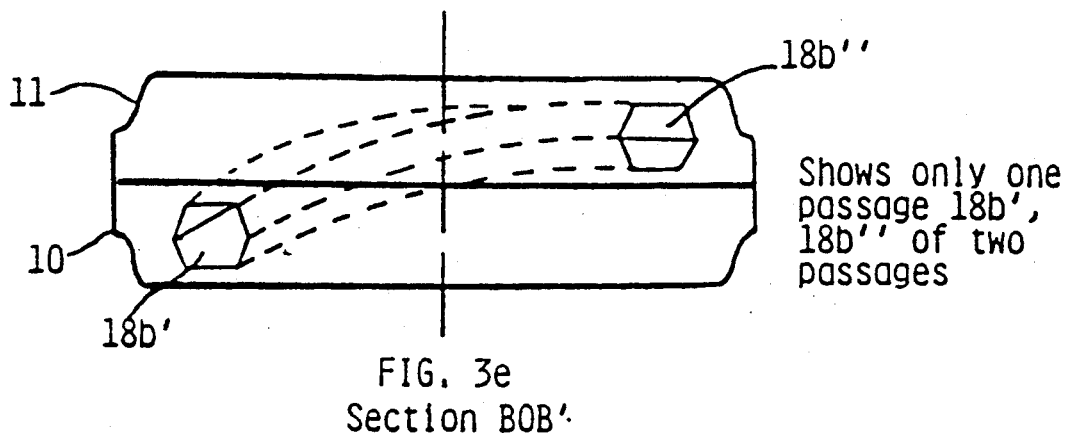

FIG. 3e shows a section through FIG. 3d along the line BOB'. The rigid partition 1 in this figure shows only one passage which is composed of 18b' and 18b" for clarity.

Figure 3F:
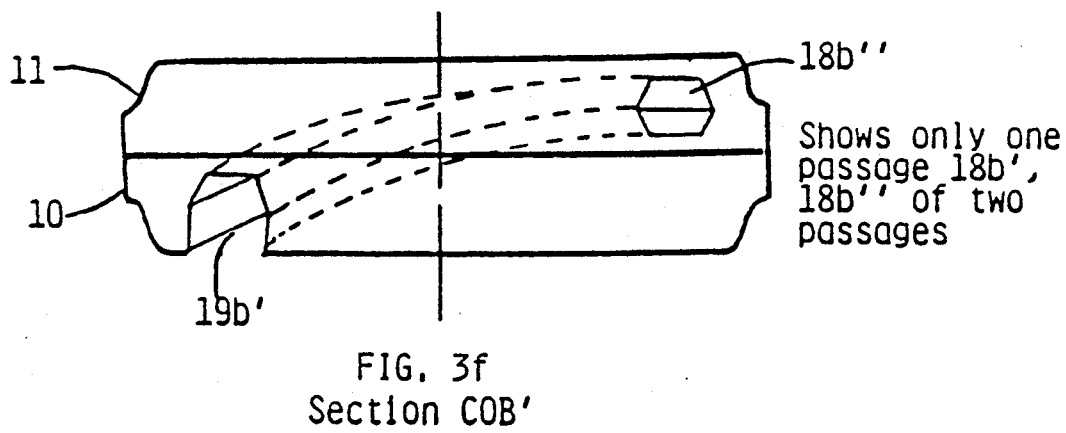

FIG. 3f shows a section COB' of FIG. 3d. This Figure, 3f, shows only one passage which is the connection of the opening 19b', with the passage 18b'. Any other passages in the rigid partition 1 have been omitted for purposes of clarity.

Figure 3G:
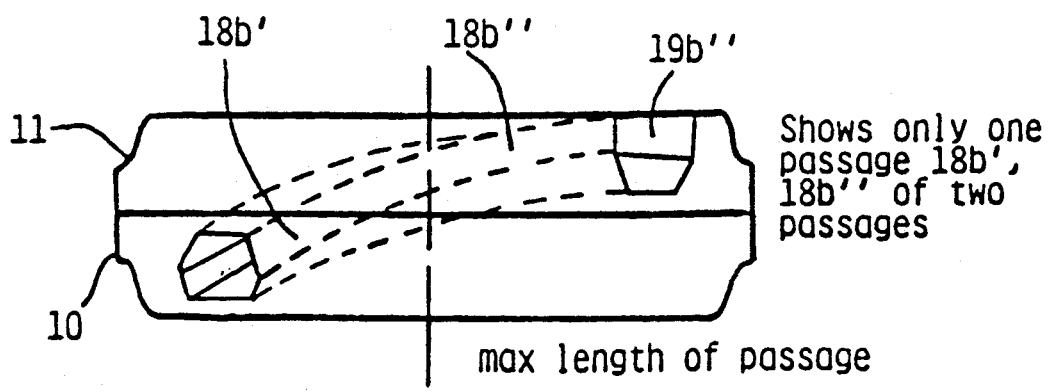

FIG. 3g shows a section BOD through FIG. 3d. As in FIGS. 3e and 3f, only one passage is shown. As in all of FIGS. 3e, 3f and 3g, the passages 18b' and 18b" of the two parts, base 10 and cover 11, are shown by dotted lines.

FIG. 4 shows a shim 20 disposed between the base 10 and cover 11. This shim has a spiral cut therein which increases the cross section of the passage 8 in the base 10.

FIG. 5a shows an alternative embodiment of the rigid partition 1. In this embodiment, the rigid partition 1 is made up lathe-worked or ground such that at least one of the base 10' or Of a base 10' the cover 11' is somewhat wedge shaped. Between these two original portions of the rigid partition 10, that is, the base 10' and the cover 11', an oblique shim 120 is disposed. This oblique shim 120 has holes therein which accept the pins 21 of the base 10' such that the pins 21 protrude through the oblique shim 120 into blind holes in the cover 11'. For simplicity and clarity, the pins 21 and the holes are not shown. The base 10' has a hole 119b' in the bottom surface thereof which connects to a passage 118b'. This passage 118b' is aligned with a hole 122 in the oblique shim 120 (shown in FIG. 5a). This hole 122 in the shim 120 is preferably somewhat larger than the opening which passage 118b' makes on the upper surface of the base 10'. This hole 122 in the oblique shim 120 connects passage 118b' to a passage 118b" in the cover 11'. This hole 122 in the oblique shim 120 is also preferably somewhat larger than the opening which the passage 118b" makes in the lower surface of the cover 11'. This passage 118b" connects with a hole 119b" in the upper surface of the cover 11'. Only one passage comprises 118b', the hole 122 and the passage 118b" of the preferably two passages in the rigid partition 1 is shown in FIG. 5a.

FIG. 5b shows a top view of the base 10' in the rigid partition 1 as shown in FIG. 5a. As can be seen from this figure, the passage 118b' of the base 10' is shorter than the corresponding passage in FIG. 3d.

FIG. 5c shows a top view of the cover 11' with only one of the holes, hole 119b", shown therein. Connected to this hole 119b" is the passage 118b", THE COVER 11' is shown rotated in the position for assembly in the rigid partition 1, such that, the opening of 118b" is aligned with the hole 122 in the oblique shim 120, as shown in FIG. 5a.

FIG. 5d shows the oblique shim 120 in section in the rigid partition 1. The oblique shim 120 is also preferably made of a plastic material which may preferably be similar to the material of the base 10' and the cover 11'. However, other materials may be used for the oblique shim 120 than for the other parts of the rigid partition 1.

Figure 5E:
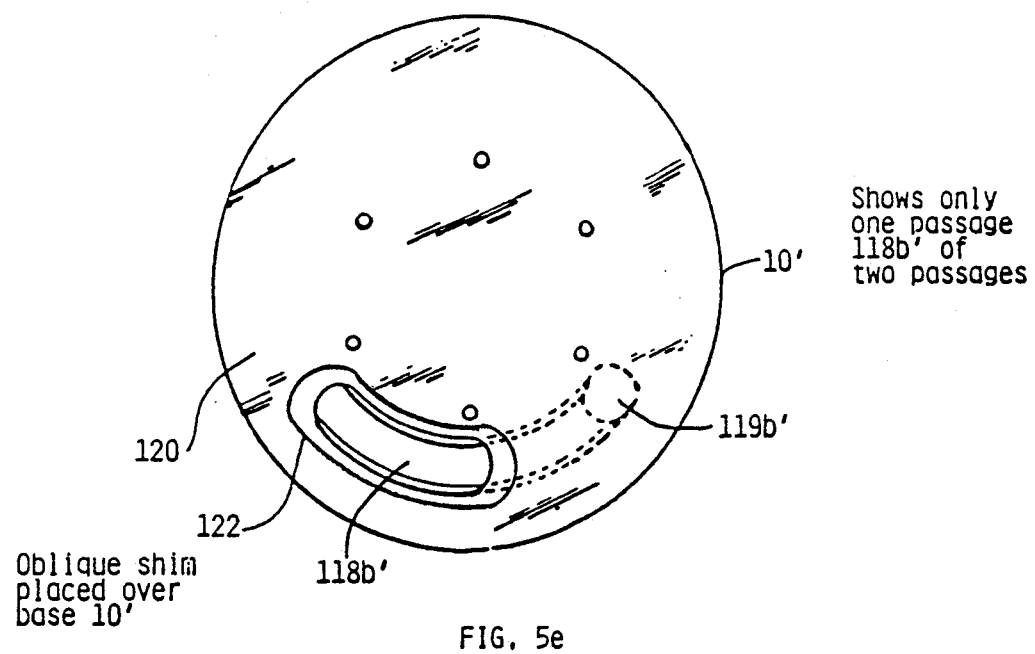
FIG. 5e shows the base of the rigid partition with the oblique shim mounted thereon, as seen in plan from above.

FIG. 5e shows the oblique shim 120 placed on the upper surface of the base 10'. As can be seen, the hole 122 in the shim is somewhat larger than the opening formed by the passage 118b' in the base 10'.

Figure 6:
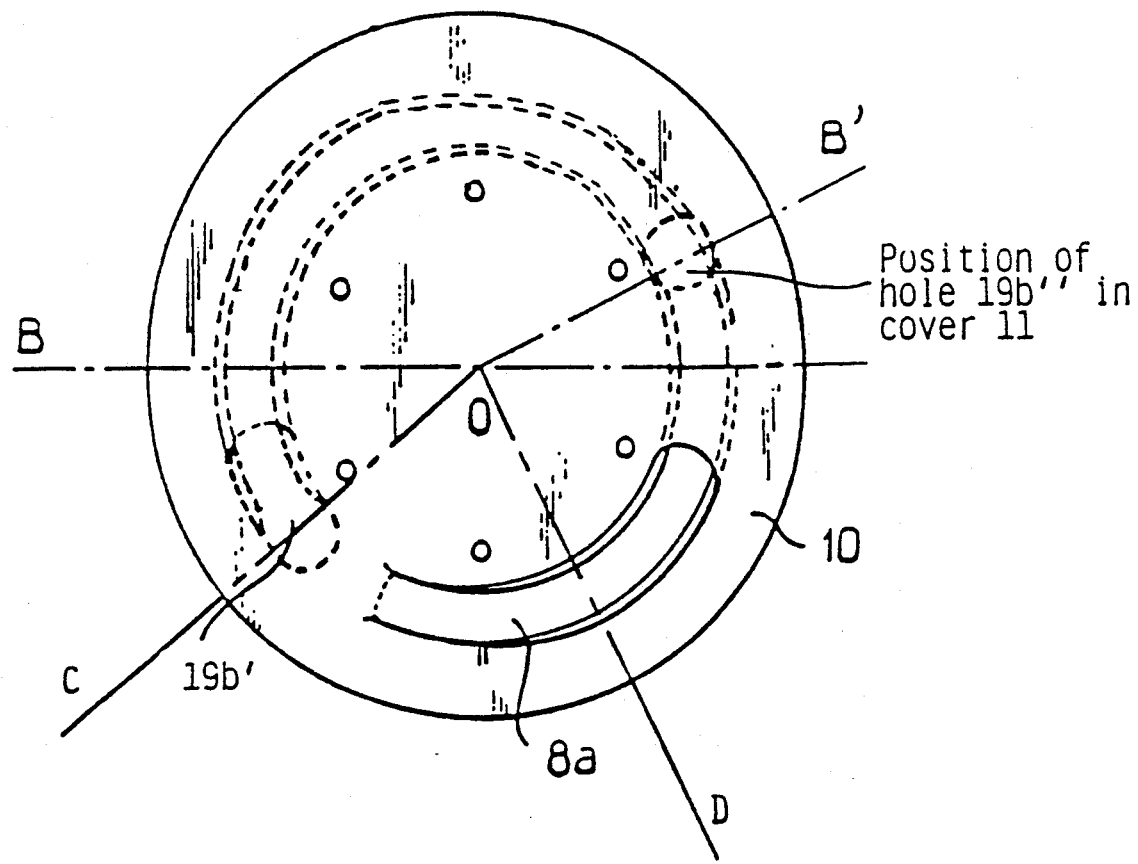
FIG. 6 illustrates one particular configuration of the rigid partition similar to FIG. 3b in which the passage for the damping liquid is realized in the shape of an extended helix.

FIG. 6 shows a helicoidal passage in the base 10, which when assembled with a similar cover 11, extends more than one revolution around the partition 1.

FIG. 7 shows a base 10 with two spiral passages 8a and 8b disposed in partition 1. The boring C is offset from the center of base 10 to provide damping at two frequencies.

The hydroelastic mounting is produced by assembling the components, manufactured separately, in the following sequence:

first of all, in a molding operation common in the rubber industry, the assembly constituting the internal rigid frame, the elastomeric conical membrane and the external rigid frame is made on a press, followed by an intimate bonding of these three elements simultaneous with the vulcanization of the elastomer compound;

independently, in a molding operation, the flexible wall which encloses the expansion space is realized;

the components, base and cover, of the rigid partition are also fabricated, these components being realized by molding polymer material, possibly reinforced, in molds of the desired shapes for the passage for the damping liquid and to produce the pins or the recessed assembly housings, in the base or the cover, respectively;

the subsequent operation comprises the assembly of the base and the cover to form a closed unit or cassette, this assembly being advantageously produced by ultrasonic welding;

the boring where the spiral or helicoidal damping passage or passages empty is then ground or lathe-worked to adjust its length;

the constituent elements of the hydroelastic mounting are then assembled, and a crimping operation completes the assembly in the form of a rigid casing. If the crimping is performed using the so-called "submarine" method or technique, the filling of the hydroelastic mounting with the damping liquid takes place during the same operation. The "submarine" method is described in U.S. Pat. No. 4,893,799 (Attorney Docket No. NHL-KLE-01), entitled "Vibration Isolation Apparatus", corresponding to French Patent Application No. 8700762, filed Jan. 23, 1987, which is hereby expressly incorporated by reference as if the entire contents thereof were fully set forth herein.

On page 5, line 16, to page 6, line 11, of U.S. Pat. No. 4,893,799, there is stated therein the following:

"In another aspect, the invention features a process for manufacture of a vibration isolation apparatus. The process comprises the steps of: a) providing a first subassembly, the first subassembly comprising an internal tube member, a first intermediate tube member and first flexible lateral end wall apparatus, the internal and the first intermediate tube members being maintained in spaced and concentric alignment by their mutual attachment to the first flexible lateral end wall apparatus; b) providing a second subassembly, the second subassembly comprising an external tube member, a second intermediate tube member and second flexible lateral end wall apparatus, the external and second intermediate tube members being maintained in spaced and concentric alignment by their mutual attachment to second flexible lateral end wall apparatus; c) submerging the first and second subassemblies in a bath of a damping fluid; d) removing substantially all air bubbles from the submerged first and second subassemblies; e) concentrically and axially mating the first and second subassemblies, such that, in the assembled configuration, the internal tube member is positioned substantially concentric with and within the second intermediate tube member, the second intermediate tube member is positioned substantially concentric with and within the fist intermediate tube member, and the first intermediate tube member is position substantially concentric with and within the external tube member; and f) maintaining the concentrically and axially mated first and second subassemblies in the assembled configuration."

On page 17, line 6 to line 29, U.S. Pat. No. 4,893,799 there is stated therein substantially the following:

A preferred process for the fabrication of such a device consists of performing the following operations:

The two assemblies, illustrated, are produced by pressure casting with a heat treatment which simultaneously vulcanizes the elastomer compound and produces a bond between the elastomer compounds and the rigid internal, intermediate and external tubes, which act as frameworks, according to a process conventionally used in the rubber transformation industry.

An assembly operation, using a so-called "submarine" assembly press, makes it possible to join the tube assemblies from which all the air bubbles have been expelled. The end of the rigid intermediate tube is freely engaged over the rigid internal tube, while the preferably bevelled end of the rigid intermediate tube is engaged in the rigid external tube, until the thin layer of elastomer compound and the elastomer compound film prevent further penetration.

A fitting force is exerted, then, by staggered circular stops which are provided on the external edge of each of the rigid tubes, at a regulated rate, so that an appropriate internal pressure is maintained by the characteristic rigidity of the elastic lateral walls. (end of substantial quote)

A variant filling of the hydroelastic mounting with the damping liquid consists of using a vacuum technique in the vessel by providing a lateral boring in a rigid casing, which is then sealed by a rivet.

The anti-vibration isolation device with integrated hydraulic damping which is the object of the invention and is designed to provide elastic suspension of drive units of vehicles or truck cabs has the advantage, over the solutions of the prior art, that it makes it possible, using identical components; to create an extended range of hydroelastic mountings adapted to each application, because of the insertion, during assembly, of a rigid partition comprising at least one damping liquid passage adapted, or adaptable, in length and cross section, to the damping function to be performed.

Because of this design, it is therefore possible to realize economically, even in limited quantities, a wide variety of hydroelastic mountings with integrated hydraulic damping, which are perfectly adapted to the requirements of individual applications.

In summing up, the elastic anti-vibration, isolation, apparatus which has integrated hydraulic damping therein comprises an elastic mounting. This elastic mounting has a thick conical membrane 2 made of an elastomeric compound. This thick conical membrane is bonded to a rigid internal frame 3 and to a rigid external frame 4 and crimped in a rigid casing. This structure encloses a damping liquid acting such that the inertia of the column of damping liquid provides a damping function which has desirable damping characteristics. The length of this column of damping liquid is very long in relationship to its average cross section. The rigid partition 1 which separates the variable volume cylinder 5 from the expansion space 6 has a passage 8 which forms the inertial column and receives the damping fluid. The passage 8 is formed by one or two parts. The dimensions of these parts can be adjusted by lathe-working or grinding of at least one of these parts, that is, the base 10 or the cover 11 of the rigid partition 1. The dimensions of the passage can be adjusted during manufacture either as an alternative to the lathe-working or by the lathe-working of the base 10 or the cover 11 to form a slightly wedge shaped configuration and then by the insertion of at least one shim between the base 10 and the cover 11. The two alternatives, the first being lathe-working at least one of the base 10 or cover 11, and the second being the insertion of shims therebetween, make it possible, using a set of substantially identically shaped components, which comprise the base 10 and the cover 11, to provide a series of hydroelastic mountings with different damping characteristics, which may be adapted to the utilization frequencies of the isolation apparatus, or, in other words, the working of the components 10 and 11 allow for the use of substantially standard components, which can then be adjusted to provide the desired damping characteristics for the isolation apparatus.

Another aspect of the invention resides in that the base 10 and cover 11, which constitute the rigid partition 1, have substantially similar geometry. This geometry may include the outer portions of the base 10 and the cover 11. Alternatively, the base 10 and the cover 11 may have a passage made up of one or two parts for receiving the damping fluid. The base 10 also has assembly pins 12 designed to fit into corresponding holes or recesses 13 in the cover 11. In the event that the spiral passage is distributed between the base 10 and the cover 11, these parts are substantially identical.

Another further aspect of the invention relates to that only the base 10 of the rigid partition 1 has a passage for damping fluid therein. The cover 11 has a flat surface which, during assembly, is placed in contact with the upper surface of the base 10. The cover 11 is held in place by the pins 12 protruding upwardly from the base 10 into the corresponding holes 13 of the cover 11.

Yet another aspect of the invention relates to the fact that the rigid partition 1 includes a passage 8 which is made up of either one or two parts. At least one of these parts has a length which is greater than that of a corresponding length of one complete revolution around the rigid partition 1. This configuration can be seen in FIG. 6, where the passage formed by the base 10 and the corresponding passage in the cover 11 have a length, when assembled, of more than one revolution. Also, in FIG. 2b, the spiral shown therein, which comprises the passage 8, extends more than one revolution around the rigid partition 1.

Still yet a further aspect of the invention provides a passage 8 for the damping fluid comprising a single spiral, as shown in FIG. 2b.

Still yet another aspect of the invention provides that the passage 8 comprises a single helix.

Yet still another aspect of the invention provides that the rigid partition 1 has a passage which is made up of two parts 8a and 8b. In this case, there are two passages in the shape of overlapping spirals, such as indicated in FIG. 7. These overlapping spirals emanate from a substantially similar central location in the rigid partition 1.

Yet a further aspect of the invention provides for two overlapping helixes which form at least two passages in the rigid partition 1, as shown in FIG. 3a. These two overlapping helixes are preferably formed about the same axis in substantially the middle portion of the rigid partition 1. There may be, in an alternative embodiment, more than two helixes. Moreover, even in this case, these helixes preferably also are formed about the same central axis 10a.

Still a further aspect of the invention provides for the regulation of the dimensions of the passage 8 which may be for in one or two parts, such that the shape of a spiral or spirals is done by boring a hole 11a having a diameter C. This boring 11a is placed to vary the shape or the length of the spirals to adjust these to a desired characteristic of length or cross section. This hole 11a is placed in the rigid partition 1 where the passage 8 is desired to empty from the rigid partition 1.

Yet still another aspect of the invention provides that the boring or hole 11a of the immediately above paragraph, as shown in FIG. 7, can be offset in such a way that if there are two spirally shaped parts 8a and 8b, which make up the passage in the rigid partition 1, the lengths thereof can be regulated independently one of the other. By regulating the dimensions or each of the two spirally shaped parts 8a and 8b independently, the damping of the isolation apparatus can be adjusted for two difference frequencies, one resulting from each of the spirally shaped parts 8a and 8b.

Still an additional aspect of the invention provides that the helicoidal or helical parts, 8a and 8b of FIG. 3b, which make up the passage for the flow of damping fluid between the chambers, can be adjusted by angular rotation during assembly or the base 10 with respect to the cover 11. The base 10 and the cover 11 can be adjusted by the rotation of one with respect to the other so that a difference set of pins 12 in the base 10 are aligned with a different one of the holes 13 of the cover 11. Because the openings, in the cover 11 and the base 10, which connect the passages of one with the other, extend over at least two of the pins 12, at least two positions of the cover 11 with respect to the base 10 can be attained. If a greater number of adjustments are required, a greater number of pins 12 than the six shown in the figures can be used, which will allow for indexing of the cover 11 with respect to the base 10 by a greater number of rotational displacements therebetween. For example, if twelve pins are used instead of the six in FIG. 6, then at least four positions can be made operationally available for adjustment of the cover 11 with respect to the base 10. This adjustment would change the length and parts of the cross sections of the passages extending through the rigid partition 1.

Still yet another additional aspect of the invention provides the capability of changing the cross sections and/or also the lengths of the two spiral or two helical parts 8a and 8b of the passage 8 by the oblique removal of at least one of the mating surfaces of the base 10 and the cover 11. The two spiral or two helical parts can thus be varied to achieve optimum damping at least two difference frequencies.

Yet still another additional aspect of the invention relating to the elastic, anti-vibration, isolation apparatus with integrated hydraulic damping provides that the adjustment of the cross sections of the connection or connections between the two sides of the rigid partition 1 can be achieved by lathe-working or grinding of at least one of the surfaces which are mated between the base 10 to the cover 11. By such lathe-working or grinding, the spiral or spirals or helix or helixes can have their cross sections adjusted simultaneously.

Yet still a further additional aspect of the invention provides that the cross section of the passage in the rigid partition, which may be formed as a spiral or spirals or as a helix or helixes, can be adjusted by the insertion, during assembly, of a flat shim between the base 10 and the cover 11. This flat shim provides for the simultaneous adjustment of at least the length of, and even in some embodiments, portions of the cross sectional area of the at least two passages, when there are two or more passages in the rigid partition 1.

The invention as described hereinabove in the context of the preferred embodiments is not to be taken as limited to all of the provided details thereof, since modifications and variations thereof may be made without departing from the spirit and scope of the invention.

What is claimed is:

1. An elastic antivibration isolation apparatus having hydraulic damping, said isolation apparatus for being interposable between a first component and a second component which vibrates relative to said first component and comprising:
- a substantially rigid external frame comprising a first mounting means for mounting said isolation apparatus on said first component;
- second mounting means for mounting said isolation apparatus on said second component, said second mounting means comprising a substantially rigid member;
- an elastomeric element interconnecting said substantially rigid external frame and said second mounting means and providing relative movement therebetween through flexure of said elastomeric element;
- an internal cavity located substantially within said external frame;
- a substantially rigid partition substantially dividing said internal cavity into a first chamber and a second chamber, the volume of said first chamber being alterable through flexure of said elastomeric element, said second chamber comprising an expansion space, said first chamber and said expansion space being substantially filled with a damping fluid, and said substantially rigid partition comprising at least one throughgoing passage for providing communication of said damping fluid between said first chamber and said expansion space; substantially said rigid partition comprising:
- a base member; and
- a cover member;
- said base and cover members having opposing faces;
- at least one of said base and cover members having at least two spiral grooves formed on its corresponding opposing face;
- each of said at least two spiral grooves separately comprising at least a portion of said throughgoing passage, each of said at least two spiral grooves being for providing said communication of said damping fluid independently of any other of said at least two spiral grooves, each of said at least two spiral grooves comprising a first end and a second end, said first end of each of said at least two spiral grooves communicating solely with said first chamber and said second end of each of said at least two spiral grooves communicating solely with said second chamber; and
- means for varying the length of at least one of said at least two spiral grooves independently of the length of any other of said at least two spiral grooves to thereby tune the damping characteristics of said elastic antivibration isolation apparatus to at least one frequency characteristic;
- said length varying means comprising at least one hole provided in at least one of said base and cover members, proximate the center thereof, and intersecting each of said at least two spiral grooves at an inwardmost extremity thereof, the diameter and position of said at least one hole determining said length of each of said at least two spiral grooves and, at least in part, the damping characteristics of said elastic antivibration isolation apparatus.

2. An antivibration isolation apparatus according to claim 1, wherein said hole is disposed tangentially with respect to at least one of said at least two spiral grooves.

3. An antivibration isolation apparatus according to claim 2, wherein said at least one of said at least two spiral grooves extends more than one full revolution within said rigid partition.

4. An antivibration isolation apparatus according to claim 2, wherein said hole is asymmetrically positioned with respect to said at least two spiral grooves such that the effective lengths of said at least two spiral grooves substantially differ from one another.

5. An antivibration isolation apparatus according to claim 4, wherein said at least one of said at least two spiral grooves extends more than one full revolution within said rigid partition.

6. The antivibration isolation apparatus according to claim 5, further including means for varying the length of two of said at least two spiral grooves, said length varying means comprising said at least one hole provided in at least one of said base and cover members.

7. An antivibration isolation apparatus according to claim 1 wherein said at least one of said at least two spiral grooves extends more than one full revolution within said rigid partition.

8. A method for tuning a plurality of elastic antivibration isolation apparatuses having hydraulic damping, each of said plurality having identical components, said plurality of isolation apparatuses comprising different groups, each of said groups having different frequency characteristics, said isolation apparatus for being interposable between a first component and a second component which vibrates relative to said first component, each said elastic antivibration isolation apparatus comprising:
- a substantially rigid external frame comprising a first mounting means for mounting said isolation apparatus on said first component;
- a second mounting means for mounting said isolation apparatus on said second component, said second mounting means comprising a substantially rigid member;
- an elastomeric element interconnecting said substantially rigid external frame and said second mounting means and providing relative movement therebetween through flexure of said elastomeric element;
- an internal cavity located substantially within said external frame;
- a substantially rigid partition substantially dividing said internal cavity into a first chamber and a second chamber, and volume of said first chamber being alterable through flexure of said elastomeric element, said second chamber comprising an expansion space, said first chamber and said expansion space being substantially filled with a damping fluid, and said substantially rigid partition comprising at least one throughgoing passage for providing communication of said damping fluid between said first chamber and said expansion space;
- said substantially rigid partition comprising:
  - a base member; and
  - a cover member;
- said base and cover members having opposing faces;
- at least one of said base and cover members having at least one spiral groove formed on its corresponding opposing face and comprising a portion of said throughgoing passage;
- said at least one spiral extending around more than one full revolution and
- said method comprising the steps of:
- starting with identical components;

assembling the identical components of the base members and the cover members to form different groups of said substantially rigid partitions;

machining a hole having at least one of:

a different diameter and a different location in each of the different groups of said substantially rigid partitions to vary the length of said at least one spiral groove in a plurality of said identical components during manufacture;

assembling during manufacture each of said different groups elastic antivibration isolation apparatuses to tune the damping characteristics of different groups of said elastic antivibration isolation apparatus to at least one different frequency; and said at least one spiral groove comprising at least two grooves in the form of a double spiral.

9. The method according to claim 8, including positioning said hole asymmetrically with respect to said at least two spiral grooves forming said double spiral, such that the effective lengths of said at least two spiral grooves substantially differ from one another.

10. The method according to claim 8, wherein said at least one of said at least two spiral grooves extends more than one full revolution within said rigid partition.

11. The method according to claim 8, wherein said hole is disposed tangentially with respect to at least one of said at least two spiral grooves.

* * * * *

UNITED STATES PATENT AND TRADEMARK OFFICE
CERTIFICATE OF CORRECTION

PATENT NO. : 5,028,038

DATED : July 2, 1991

INVENTOR(S) : Etienne de FONTENAY

It is certified that error appears in the above-identified patent and that said Letters Patent is hereby corrected as shown below:

In column 1, line 47, after 'damper', insert --.--.
In column 3, line 6, after 'parts', insert --.--.
In column 3, line 39, after 'helixes.', begin a new paragraph, starting with 'One'.
In column 4, line 50, after 'the', delete "safe" and insert --same--.
In column 5, line 48, after 'same', insert --.--.
In column 5, line 59, after 'of', delete "1,".
In column 7, line 66, after 'part', insert --,--.
In column 7, line 67, after 'length', delete "or" and insert --of--.
In column 7, line 68, after 'or', delete "lath" and insert -- lathe- --.
In column 8, line 18, after 'helixes,', delete "show" and insert --shown--.
In column 8, line 23, after 'partition', delete "10" and insert --1.--.
In column 9, line 57, after 'passage', delete "18b'" and insert --18b''--.

UNITED STATES PATENT AND TRADEMARK OFFICE
CERTIFICATE OF CORRECTION

PATENT NO. : 5,028,038
DATED : July 2, 1991
INVENTOR(S) : Etienne de FONTENAY It is certified that error appears in the above-identified patent and that said Letters Patent is hereby corrected as shown below:

In column 10, line 3, after 'up', insert --of a base 10' and a cover 11', at least one of which has been--.
In column 10, line 4, after 'or', delete "Of a base 10'".
In column 10, line 34, after "118b'"", delete ", THE COVER" and insert --. The cover--.
In column 11, line 31, after 'for', insert --the--.
In column 11, line 44, after 'to', insert --the--.
In column 11, line 56, after 'is', delete "position" and insert --positioned--.
In column 12, line 27, after 'components', delete ";" and insert --,--.
In column 13, line 59, after 'be', delete "for" and insert --formed--.
In column 14, line 13, after 'assembly', delete "or" and insert --of--.
In column 14, line 38, after the first instance of 'two', delete "spiral" and insert --spirals--.
Col. 15, In Claim 1, lines 30-31, after 'space;', delete "substantially said" and insert --said substantially--.

Signed and Sealed this

Twenty-second Day of December, 1992

Attest:

DOUGLAS B. COMER

*Attesting Officer* — *Acting Commissioner of Patents and Trademarks*